United States Patent
Abdel-Kader (10) Patent No.: US 8,775,157 B2
(45) Date of Patent: Jul. 8, 2014

(54) METHODS AND SYSTEMS FOR SHARING LANGUAGE CAPABILITIES

(75) Inventor: Sherif Aly Abdel-Kader, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 484 days.

(21) Appl. No.: 13/091,483

(22) Filed: Apr. 21, 2011

(65) Prior Publication Data
US 2012/0271619 A1 Oct. 25, 2012

(51) Int. Cl.
*G06F 17/28* (2006.01)
*G06F 17/20* (2006.01)
*G06F 17/27* (2006.01)
*G06F 3/00* (2006.01)
*G06F 15/16* (2006.01)
*H04M 3/00* (2006.01)
*H04W 4/00* (2009.01)

(52) U.S. Cl.
USPC ............ 704/3; 704/2; 704/8; 704/9; 715/236; 715/703; 709/206; 709/207; 709/246; 709/230; 455/418; 455/466

(58) Field of Classification Search
USPC ........... 704/3, 2, 8, 9; 715/703, 236; 709/206, 709/207, 246, 230; 705/5; 455/418, 466
See application file for complete search history.

(56) References Cited

U.S. PATENT DOCUMENTS

| | | | |
|---|---|---|---|
| 5,884,246 A * | 3/1999 | Boucher et al. | 704/2 |
| 7,120,573 B2 | 10/2006 | Honeywood | |
| 7,660,594 B2 | 2/2010 | Chava et al. | |
| 2002/0193986 A1 * | 12/2002 | Schirris | 704/8 |
| 2003/0065504 A1 * | 4/2003 | Kraemer et al. | 704/8 |
| 2003/0125927 A1 * | 7/2003 | Seme | 704/3 |
| 2005/0033814 A1 | 2/2005 | Ota | |
| 2005/0081150 A1 * | 4/2005 | Beardow | 715/531 |
| 2005/0144243 A1 * | 6/2005 | Cheng | 709/206 |
| 2005/0267738 A1 * | 12/2005 | Wilkinson et al. | 704/9 |
| 2006/0119583 A1 | 6/2006 | Potera | |
| 2006/0133585 A1 | 6/2006 | Daigle et al. | |

(Continued)

FOREIGN PATENT DOCUMENTS

| | | |
|---|---|---|
| GB | 2 395 029 | 5/2004 |
| JP | 2006011800 | 1/2006 |
| JP | 2007323168 | 12/2007 |
| WO | 2005/009061 | 1/2005 |

OTHER PUBLICATIONS

Extended European Search Report issued in European Patent Application No. 11163407.7, dated Sep. 29, 2011 (5 pages).

(Continued)

*Primary Examiner* — Paras D Shah
*Assistant Examiner* — Neeraj Sharma
(74) *Attorney, Agent, or Firm* — Finnegan, Henderson, Farabow, Garrett & Dunner LLP (57) ABSTRACT

Methods and systems for sharing information on languages supported by portable electronic devices are disclosed. Some embodiments of the disclosed methods involve, for example, a first portable electronic device transmitting to a server, information identifying the first portable electronic device, and information related to one or more languages that the first portable electronic device is capable of displaying. The server stores the received information, and shares the information with electronic devices that subsequently request information on the language capabilities of the first portable electronic device.

18 Claims, 9 Drawing Sheets

(56) References Cited

U.S. PATENT DOCUMENTS

| | | | |
|---|---|---|---|
| 2006/0206310 A1* | 9/2006 | Ravikumar et al. | 704/9 |
| 2006/0293039 A1* | 12/2006 | Maislos | 455/418 |
| 2006/0294463 A1 | 12/2006 | Chu et al. | |
| 2007/0135145 A1* | 6/2007 | Lee et al. | 455/466 |
| 2007/0156818 A1 | 7/2007 | Tanaka et al. | |
| 2007/0168450 A1* | 7/2007 | Prajapat et al. | 709/207 |
| 2007/0178918 A1* | 8/2007 | Shon | 455/466 |
| 2007/0180143 A1* | 8/2007 | Greeff | 709/246 |
| 2007/0255554 A1* | 11/2007 | Cai | 704/9 |
| 2007/0265828 A1* | 11/2007 | Lorraine Scott et al. | 704/9 |
| 2008/0046231 A1* | 2/2008 | Laden et al. | 704/8 |
| 2008/0082678 A1* | 4/2008 | Lorch et al. | 709/230 |
| 2008/0221862 A1* | 9/2008 | Guo et al. | 704/2 |
| 2008/0243472 A1 | 10/2008 | DeGroot et al. | |
| 2008/0262827 A1* | 10/2008 | DeGroot | 704/3 |
| 2009/0043562 A1* | 2/2009 | Peshave et al. | 704/2 |
| 2009/0112638 A1* | 4/2009 | Kneller et al. | 705/5 |
| 2009/0187398 A1* | 7/2009 | Wrobel | 704/8 |
| 2009/0234633 A1 | 9/2009 | Chao-Suren et al. | |
| 2009/0248392 A1* | 10/2009 | Talwar et al. | 704/3 |
| 2009/0305729 A1 | 12/2009 | Bennett | |
| 2010/0077051 A1* | 3/2010 | Daniell et al. | 709/206 |
| 2010/0185434 A1 | 7/2010 | Burvall et al. | |
| 2011/0022948 A1* | 1/2011 | Brown et al. | 715/236 |
| 2012/0165048 A1* | 6/2012 | Zhu | 455/466 |
| 2013/0144599 A1* | 6/2013 | Davis et al. | 704/2 |

OTHER PUBLICATIONS

Alvestrand, H., IETF Policy on Character Sets and Languages, The Internet Society, 1998, found on the internet at URL: http://www.faqs.org/rfcs/rfc2277.html (8 pages).

Getting Started HP Instant Share Solution—HP Customer Care . . . Depending on your region, several HP Instant Share services are available to use to share photos with family and friends. For . . . The recipient can easily view, print, or save the photos to a computer, and more. The Web page is automatically displayed in a language based on the recipient's Web browser settings . . . You are attempting to setup or manage a device that was registered with HP Instant Share under a different HP Passport account. Only . . . , found on the internet at URL: h10025.www1.hp.com/ewfrf/wc/document?, link current as of Sep. 22, 2010 (link no longer available).

"The SAP Fan Club Forums, Print Country Name in Recipient Language using MEDRUCK Form" (posts dated Oct. 2002) from URL: http://www.sapfans.com/forums/viewtopic.php?f=6&t=464 (accessed from the Internet on Jul. 21, 2011) (3 pages).

Office Action issued in European Patent Application No. 11163407.7, dated Apr. 17, 2013 (4 pages).

\* cited by examiner

METHODS AND SYSTEMS FOR SHARING LANGUAGE CAPABILITIES

FIELD OF TECHNOLOGY

The present disclosure relates to sharing information on languages supported by portable electronic devices, and includes without limitation, systems and methods for using language information to notify the sender of a message to a recipient portable electronic device, that the message is not displayable on the recipient portable electronic device.

BACKGROUND

Portable electronic devices have gained widespread use and provide a variety of functions including, for example, telephonic, electronic messaging, text messaging, and other personal information manager (PIM) application functions. Portable electronic devices include, for example, several types of mobile stations such as simple cellular telephones, smart telephones, wireless personal digital assistants (PDAs), and laptop computers with wireless communication capabilities based on, for example, the 802.11 or Bluetooth® communications protocols.

Commonly, in order to accurately display a message that is in a particular language on a portable electronic device, a character set corresponding to the particular language must be installed on the device. Smaller portable electronic devices such as smart telephones and PDAs typically have limited memory resources, and as a result, users of such devices typically choose to install character sets corresponding to only a few languages. Nevertheless, as portable electronic devices have gained in popularity, a wider variety of languages are used for message communication.

The disincentive to install a variety of character sets on portable electronic devices, combined with the increase in the variety of languages used to communicate messages between users of portable electronic devices, has contributed to an increase in situations where a portable electronic device receives a message that it is unable to display. Likewise, senders of messages bound for portable electronic devices are more likely to be unfamiliar with the language capabilities of recipient portable electronic devices, and consequently more likely to send messages to recipient devices that are not displayable on these devices.

BRIEF DESCRIPTION OF THE DRAWINGS

The accompanying drawings, which are incorporated in and constitute a part of this specification, illustrate several example embodiments of the present disclosure. In the drawings.

DETAILED DESCRIPTION

Reference will now be made in detail to the example embodiments of the present disclosure, which are illustrated in the accompanying drawings. For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

The disclosure generally relates to portable electronic devices. Examples of portable electronic devices include mobile or handheld wireless communication devices such as pagers, cellular phones, cellular smart-phones, wireless organizers, personal digital assistants, wirelessly enabled notebook computers, netbooks, tablets, and so forth. The portable electronic device may also be a portable electronic device without wireless communication capabilities, such as a handheld electronic game device, digital photograph album, digital camera, or other portable device.

Figure 1:
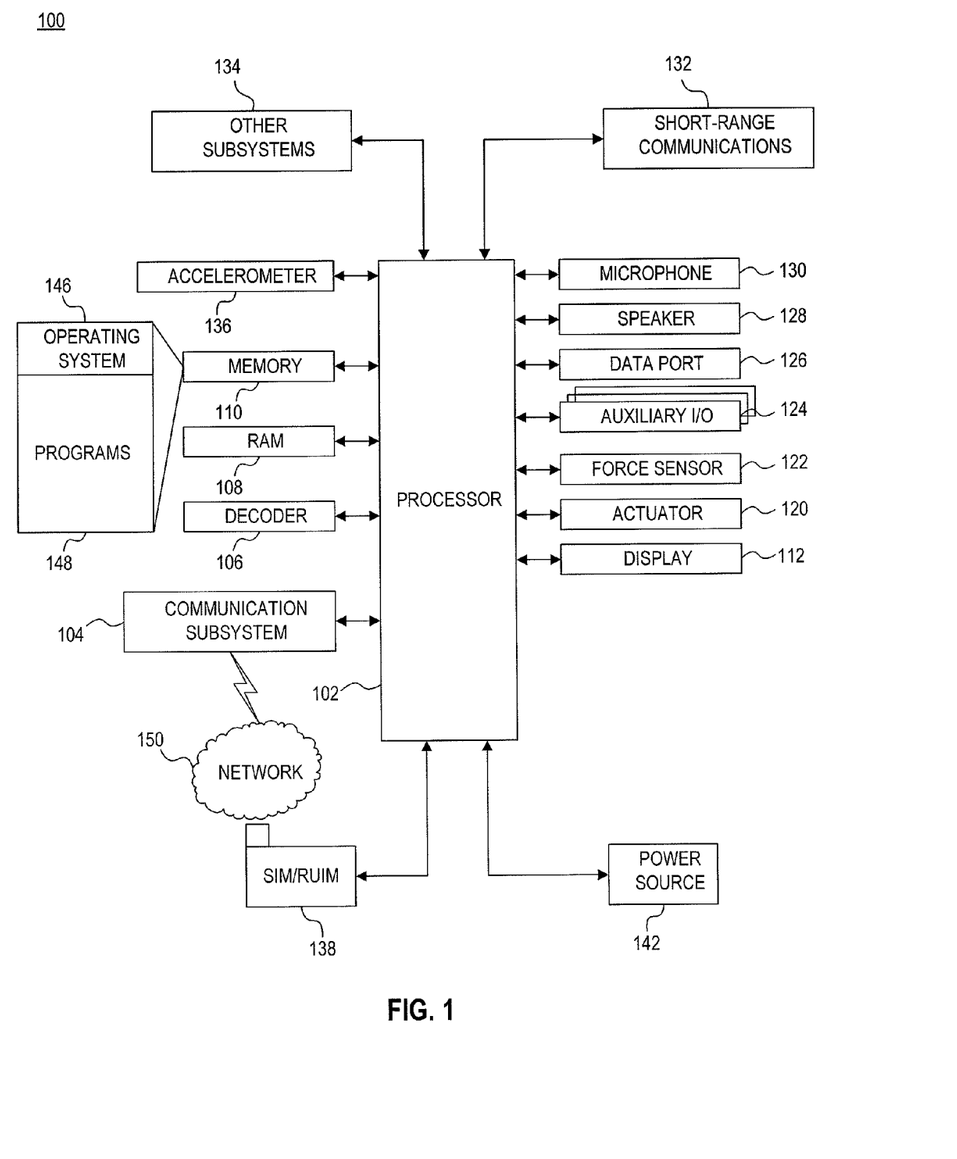
FIG. 1 is a block diagram of a portable electronic device, consistent with disclosed example embodiments.

A block diagram of an example of a portable electronic device 100 is shown in FIG. 1. Portable electronic device 100 includes multiple components, such as processor 102 that controls the overall operation of the portable electronic device 100. In some embodiments, processor 102 is a microprocessor (μP). Communication functions, including data and voice communications, are performed through communication subsystem 104. Data received by the portable electronic device 100 is optionally decompressed and decrypted by a decoder 106. Communication subsystem 104 receives messages from and sends messages to a network 150. In various embodiments, network 150 is a type of wireless network, including, but not limited to, data wireless networks, voice wireless networks, and networks that support both voice and data communications. Power source 142, such as one or more rechargeable batteries or a port to an external power supply, powers portable electronic device 100.

Processor 102 interacts with other device components, such as Random Access Memory (RAM) 108, memory 110, and display 112. According to various embodiments, display 112 is a type of display screen for portable devices, including, but not limited to, a touch-sensitive display. User-interaction with a graphical user interface is performed through display 112. Information, such as text, characters, symbols, images, icons, and other items that may be displayed or rendered on portable electronic device 100, are displayed on display 112 via the processor 102.

Processor 102 also interacts with one or more actuators 120, one or more force sensors 122, auxiliary input/output (I/O) subsystem 124, data port 126, speaker 128, microphone 130, short-range communications 132, and other device subsystems 134. Processor 102 interacts with accelerometer 136, which is utilized to detect the direction of gravitational forces or gravity-induced reaction forces.

To identify a subscriber for network access, portable electronic device 100 uses a Subscriber Identity Module or a Removable User Identity Module (SIM/RUIM) card 138 for communication with a network, such as wireless network 150. Alternatively, user identification information may be programmed into memory 110.

Portable electronic device 100 includes operating system 146 and software programs or components 148 that are executed by the processor 102 and, in this configuration, are stored in a persistent, updatable memory 110. Additional applications, data, or programs are loaded onto portable electronic device 100 through the wireless network 150, auxiliary I/O subsystem 124, data port 126, short-range communications subsystem 132, or any other suitable subsystem 134.

A received signal such as a text message, an e-mail message, or web page download is processed by communication subsystem 104 and input to processor 102. Processor 102 processes the received signal for output to display 112 and/or to auxiliary I/O subsystem 124. A user may generate data items, for example e-mail or text messages, which may be transmitted over wireless network 150 through communication subsystem 104. For voice communications, the overall operation of the portable electronic device 100 is similar. Speaker 128 outputs audible information converted from electrical signals, and microphone 130 converts audible information into electrical signals for processing. Speaker 128, display 112, and data port 126 are considered output apparatus of portable electronic device 100.

In some example embodiments, one or more actuators 120 provides input to the processor 102 when actuated. Actuation of the actuator 120 results in the provision of tactile feedback. In certain embodiments, a mechanical dome switch may be utilized as one or more of actuators 120. Tactile feedback is provided when the dome collapses due to imparted force and when the dome returns to the rest position after release of the switch. Alternatively, actuator 120 may comprise one or more piezoelectric (piezo) devices that provide tactile feedback for a touch-sensitive display. Actuator 120, touch-sensitive display 112, force sensor 122, microphone 130, and data port 126 are input apparatuses for portable electronic device 100.

Figure 2:
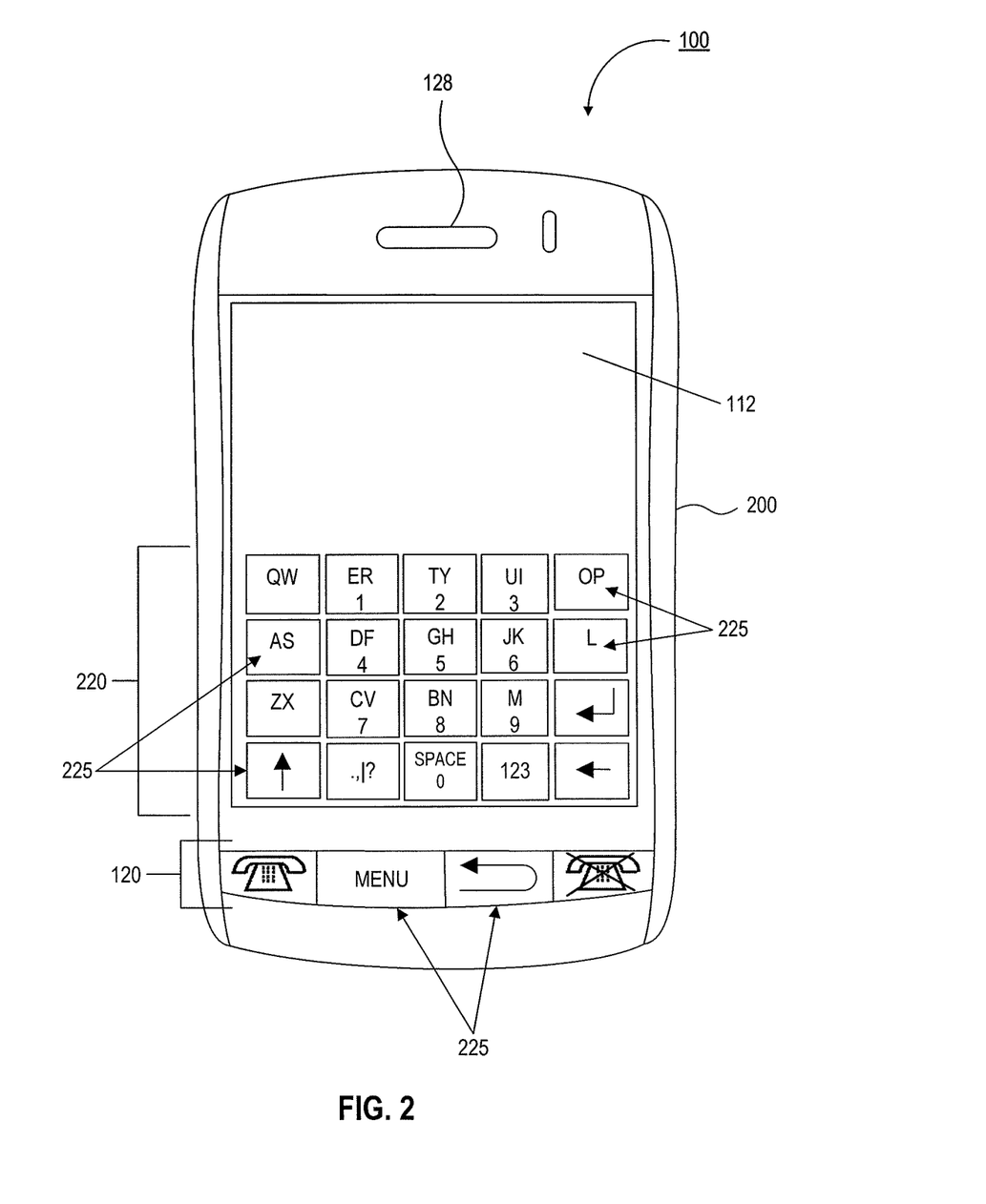
FIG. 2 is a top plan view of a portable electronic device, consistent with disclosed example embodiments.

A top plan view of an example portable electronic device 100 is shown generally in FIG. 2. Example portable electronic device 100 includes housing 200 in which various components as shown in FIG. 1 are disposed. For example, various input apparatuses and output apparatuses, processor 102, and memory 110 for storing at least programs 148, shown in FIG. 1, are disposed in housing 200. Processor 102 is responsive to input signals from input apparatuses, such as the display 112 or actuator 120, and optionally provides output signals to output apparatuses, such as the display 112 or speaker 128. Processor 102 also interfaces with memory 110 and is enabled to execute programs 148.

As can be understood from FIG. 2, the output apparatus includes display 112 and speaker 128, each of which are responsive to one or more output signals from processor 102. The input apparatus includes keyboard 220. As described above, input members 225 on keyboard 220 are rendered on touch-sensitive display 112. For example, each input member can be defined by specific coordinates of display 112. The input members 225 are each associated with at least a character (such as alphanumeric characters) in a text input mode of operation. In the presently described example embodiment, the indicia indicating the character associated with an input member 225 can change depending on the current input language. Alternatively, input members 225 are mechanical keys using, for example, a mechanical dome switch actuator or a piezoelectric actuator. In certain embodiments, input members 225 may form a QWERTY keyboard or other known keyboard layouts, either in reduced or full format. Although not shown in FIG. 2, portable electronic device 100 optionally includes other input apparatuses, such as a scroll wheel, an optical trackpad, or a ball located either on the face or side of device 100. These input apparatuses provide additional input to processor 102.

Figure 3:
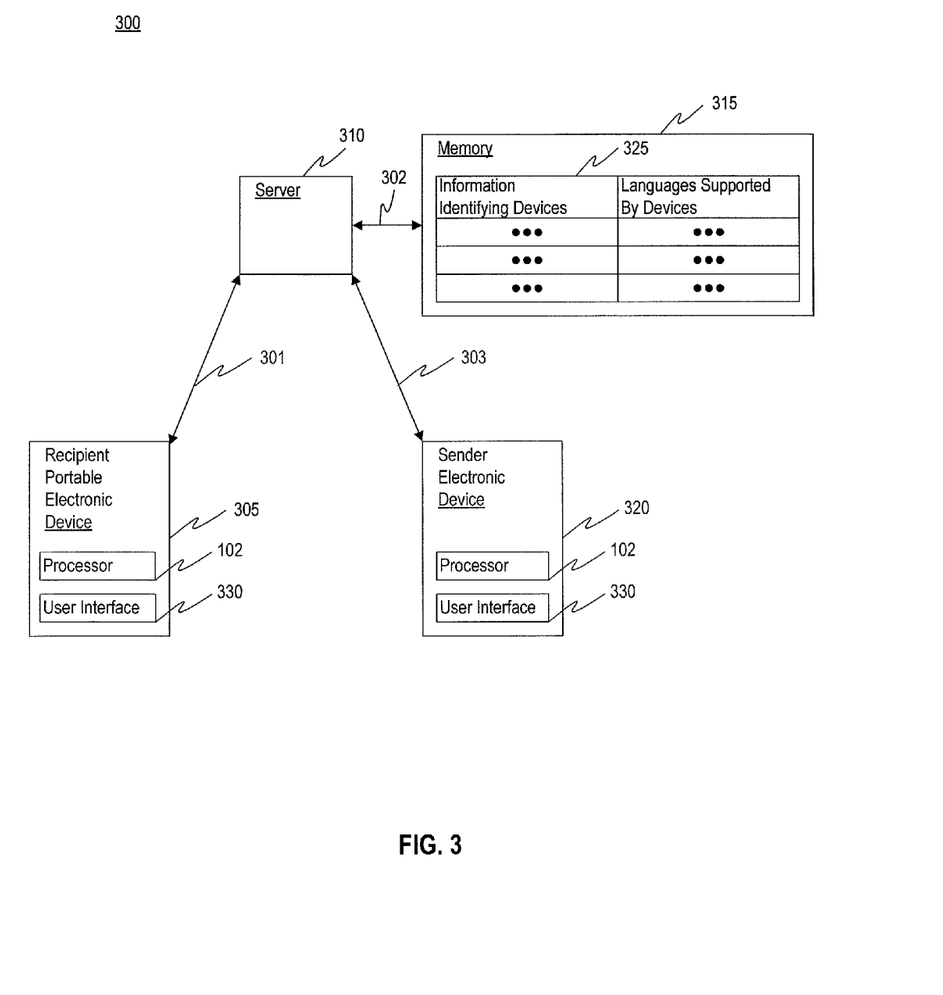
FIGS. 3 and 4 each depict an example system for sharing information related to languages supported by portable electronic devices, consistent with disclosed example embodiments.

FIG. 3 depicts an example system 300 for sharing information related to languages supported by portable electronic devices, consistent with disclosed example embodiments. The languages supported by a portable electronic device, includes, but is not limited to, human languages that are displayable on the portable electronic device. In various embodiments, a portable electronic device is able to display a human language, such as Arabic, if it has the associated character set installed or otherwise accessible. Information related to languages supported by portable electronic devices includes, but is not limited to, information on character sets installed on, and language preferences associated with, portable electronic devices. System 300 includes, without limitation, recipient portable electronic device 305, server 310, memory 315, and sender electronic device 320.

Recipient portable electronic device 305 (hereafter "recipient device 305") is, for example, a portable electronic device 100, and transmits to server 310, via link 301, information identifying itself and information related to the languages it supports. In some example embodiments, recipient device 305, when powered-on, transmits a device identifier, such as an IMEI (International Mobile Equipment Identifier), a PIN (Personal Identification Number), or a MAC (Media Access Control) address, and a list of languages corresponding to the character sets installed on recipient device 305. In other embodiments, recipient device 305 transmits a device identifier and a list of supported languages after detecting an event that requires the transmission of this information, such as the passage of a period of time. Alternatively, server 310 maintains a language listing or similar reference for portable electronic devices, in which case recipient device 305 need only provide a device identifier, using which server 310 identifies a list of languages supported by recipient device 305. Recipient device 305 includes processor 102 and user interface 330, which includes, but is not limited to, microphone 130, speaker 128, data port 126, auxiliary I/O 124, force sensor 122, actuator 120, and display 112. The term link refers to any connection that enables the communication of information between at least two entities. For example, a link includes a wired communications connection, a wireless communications connection, a radio frequency communications connection, and an optical communications connection. Link 301, in various embodiments, is a wireless communication connection between recipient device 305 and server 310.

Server 310 is any type of computer server, including but not limited to, a presence server, and a server that receives, maintains, or disseminates information related to portable electronic devices. In certain embodiments, server 310 is communicatively coupled to memory 315 via link 302, and stores, updates, and accesses one or more associations 325 in memory 315, between information identifying one or more portable electronic devices and languages supported by the one or more portable electronic devices. For example, in an example embodiment, memory 315 stores an association between the device identifier associated with recipient device 305 and a list of languages installed on or supported by recipient device 305.

Embodiments of memory 315 include, without limitation, various types of storage media, e.g., volatile and non-volatile computer memory such as RAM, PROM, EPROM and EEPROM, floppy disks, compact disks, optical disks, and magnetic tape. In some example embodiments, the storage media is encoded with one or more programs capable of being executed on a processor. In various embodiments memory 315 is a commercially available database. The term "program" is used herein to refer to any type of computer code (e.g. software, firmware, or microcode) that can be executed on a processor.

In the presently described example embodiment, sender electronic device 320 (hereafter "sender device 320") includes processor 102 and user interface 330. Sender device 320 receives from server 310, via link 303, information related to one or more languages supported by recipient device 305. Information related to one or more languages supported by an electronic device comprises information reflecting a set of languages supported by the electronic device. Sender device 320 is any type of electronic device that is able to communicate with other electronic devices. In some embodiments, sender device 320 is a portable electronic device, and in other embodiments sender device 320 is a desktop computer that is communicatively connected to a computer network, but is not easily portable. In some embodiments, sender device 320 queries server 310 using information identifying recipient device 305 and receives, in response to the query, a list of supported languages corresponding to character sets installed on the recipient device 305. In another embodiment, server 310 provides the language information for recipient device 305 as part of a different interactive and dynamic session with server 310 during the message transmission process. For example, sender device 320 contacts server 310 with a request for information on the languages supported by the devices associated with a list of contacts stored on sender device 320. In response, sender device 320 receives from server 310 information on the languages supported by multiple portable electronic devices, including recipient device 305.

Following the receipt of information related to the languages supported by recipient device 305, processor 102 of sender device 320, in some example embodiments, determines whether a message to recipient device 305 is displayable on recipient device 305. The term message includes, but is not limited to, a text message, an electronic mail (E-mail) message, and an instant message. In some example embodiments, this determination comprises determining whether a language of composition associated with the message for recipient device 305 is a language not supported by recipient device 305. A language of composition refers to any human language used to compose one or more parts of a message. In some other embodiments, processor 102 of sender device 320 additionally determines whether one or more parts of the message for recipient device 305 is in a language not supported by recipient device 305.

If the message for recipient device 305 is determined by processor 102 of sender device 320 to not be displayable on recipient device 305, user interface 330 of sender device 320 notifies the user of sender device 320 that the message for recipient device 305 is not displayable on recipient device 305. In certain embodiments, the user of sender device 320 is notified visually, via, for example, a pop-up message displayed on display 112. In other embodiments, the user is notified via an auditory message delivered via speaker 128, or a tactile stimulus delivered via actuator 120.

Figure 4:
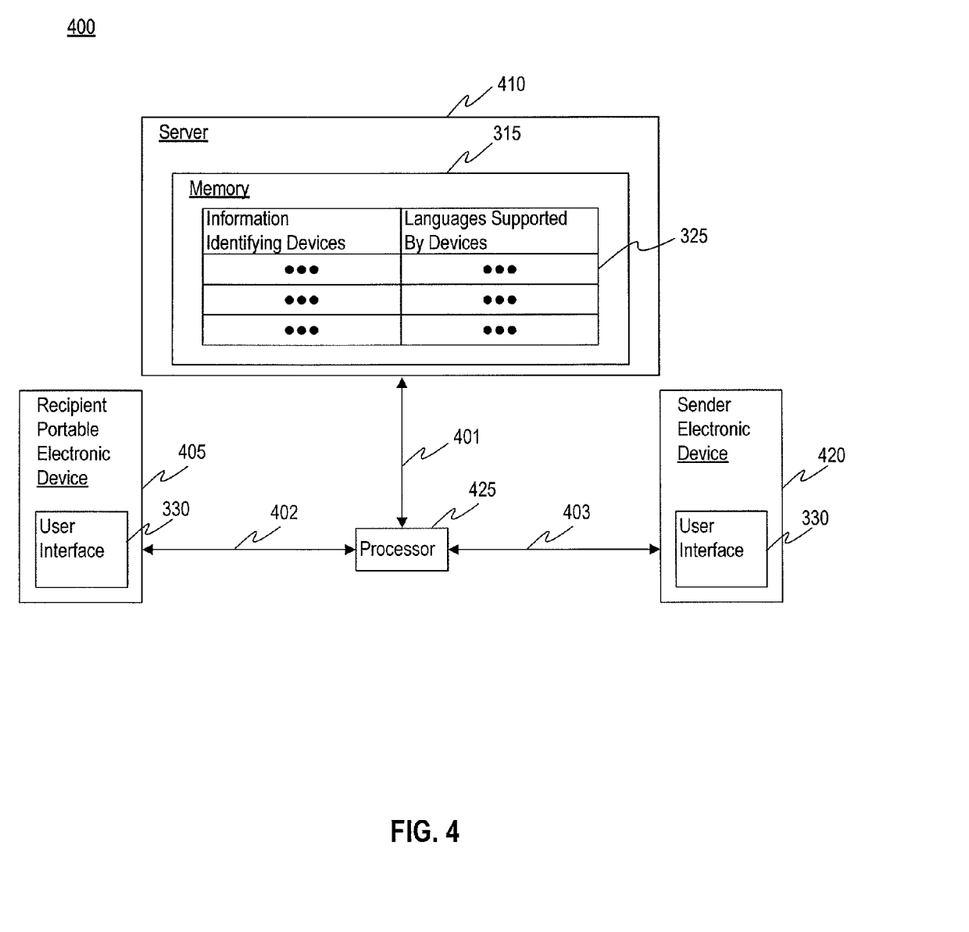

FIG. 4 depicts an example system 400 for sharing information related to languages supported by portable electronic devices, consistent with disclosed example embodiments. System 400 includes, without limitation, recipient portable electronic device 405, server 410, sender electronic device 420, and processor 425.

Recipient portable electronic device 405 is, for example, a portable electronic device 100, and transmits, via link 402, information identifying itself and information related to the languages it supports. Processor 425 is a processor, such as processor 102. According to some embodiments, processor 425 is installed within or communicatively coupled to an electronic device, such as a server that responds to requests from portable electronic devices. Processor 425 is also communicatively coupled to server 410 via link 401. In various embodiments, processor 425 receives information transmitted by recipient device 405 via link 402, and transmits the received information to server 410 via link 401. Processor 425 also transmits information received from server 410 to sender electronic device 420, via link 403.

Server 410 is any computer server, such as server 310. In the example embodiment described presently, server 410 includes memory 315. In various embodiments, memory 315 is located remotely from server 410. Server 410 stores, updates, and accesses one or more associations 325 in memory 315, between information identifying one or more portable electronic devices and information on languages supported by the one or more portable electronic devices.

Upon receiving, from processor 425, the information identifying recipient device 405 and the information related to the languages supported by recipient device 405, server 410 stores the received information in memory 315, and creates or updates an association in memory 315 between the information identifying recipient device 405 and the information related to the languages supported by recipient device 405.

Sender electronic device 420 (hereafter "sender device 420") is an electronic device such as sender device 320, and receives from server 410, via processor 425 and links 401 and 403, information related to one or more languages supported by recipient device 405. In some example embodiments, sender device 420 transmits, via link 403, a query that comprises information identifying recipient device 405, and information identifying one or more languages associated with a message for recipient device 405. For example, sender device 420 transmits a device identifier associated with recipient device 405 and information identifying a language, such as Japanese, associated with an e-mail being composed for recipient device 405. In such embodiments, processor 425, receives the query and transmits it to server 410 via link 401.

In response to the query transmitted to server 410, processor 425 receives from server 410, via link 401, information on the languages supported by recipient device 405. In various example embodiments, processor 425 determines, based on the information related to languages supported by recipient device 405, and the information identifying one or more languages associated with the message for recipient device 405, whether the message for recipient device 405 is displayable on recipient device 405. Processor 425 then forwards this determination to sender device 420, via link 403.

If the message for recipient device 405 is determined by processor 425 to not be displayable on recipient device 405, user interface 330 of sender device 420 notifies the user of the sender device 420 that the message for recipient device 405 is not displayable on recipient device 405.

Figure 5:
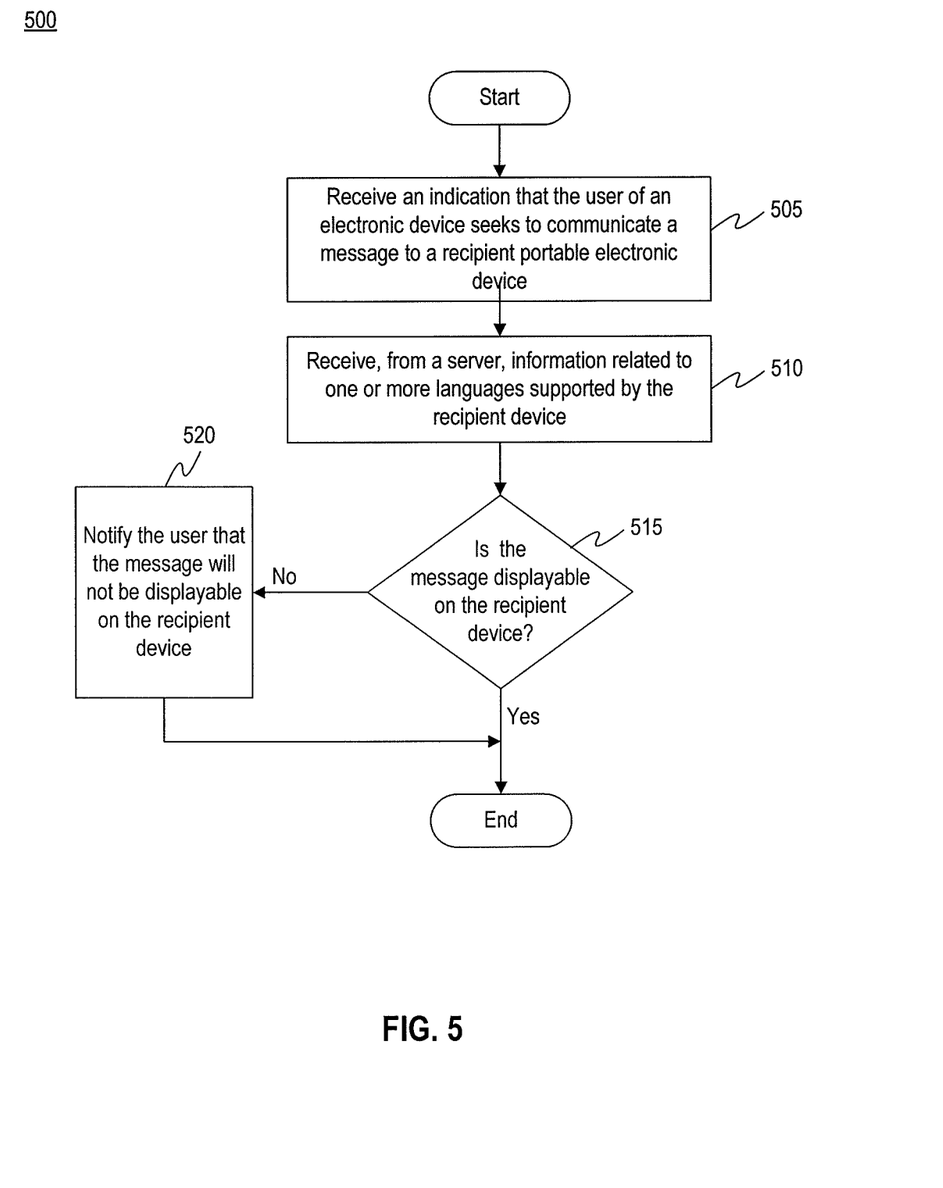
FIGS. 5, 6, and 7 each depict a flow diagram of an example process for sharing information related to languages supported by portable electronic devices, consistent with disclosed example embodiments.

FIG. 5 is a flow diagram of an example process 500 for sharing information related to one or more languages supported by portable electronic devices, consistent with disclosed example embodiments. The method is carried out by software or firmware, for example as part of programs 148, that is stored in Random Access Memory (RAM) 108 or memory 110, and is executed by, for example, processor 102.

At Step 505, software or firmware executing on processor 102 of an electronic device receives an indication that the user of the portable electronic device wishes to communicate a message to a potential recipient portable electronic device. For the sake of convenience and clarity, sender device 320 will be used as an example electronic device used by a user wishing to communicate a message to a potential recipient portable electronic device, and recipient device 305 will be used as an example potential recipient portable electronic device.

In certain embodiments, the received indication comprises the user of sender device 320 specifying an e-mail address, a phone number, or other identifier associated with a user of recipient device 305, using an e-mail, text messaging or other application. For example, the user of sender device 320 invokes an e-mail application on sender device 320, and selects an e-mail address associated with a user of recipient device 305, which results in an indication that the user of sender device 320 wishes to communicate a message to recipient device 305. In other embodiments, the indication is the issuance of a command to transmit a message from sender device 320 to recipient device 305. For example, the user of sender device 320 activates a 'send' button associated with an e-mail or text message for a user of recipient device 305, which results in an indication that the user of sender device 320 wishes to communicate a message to recipient device 305. In many example indications, software or firmware executing on processor 102 of sender device 320 monitors the sender device 320 for an indication that the user of sender device 320 seeks to communicate a message to a user of another electronic device. In many embodiments, a device identifier associated with recipient device 305 is identified by searching a collection of data using an identifier (e.g. an e-mail address or a phone number) associated with a user of recipient device 305.

At Step 510, software or firmware executing on processor 102 of sender device 320 receives from a server, such as server 310, information related to one or more languages supported by recipient device 305. In various embodiments, the server is located remotely from sender device 320. The information related to one or more languages supported by recipient device 305 is a list of character sets installed on recipient device 305. The information related to the languages supported by recipient device 305 is received over network 150, via communication subsystem 104. Moreover, in some example embodiments, this information is received in response to one or more queries generated and transmitted to server 310, by sender device 320. The one or more queries use information capable of identifying recipient device 305 and stored on memory 110 of sender device 320.

In some embodiments, at Step 510, processor 102 receives the language information from a storage device of sender device 320, such as memory 110. In such embodiments, memory 110 stores information relating to the languages supported by a set of portable electronic devices. The set of portable electronic devices includes devices that have previously communicated with sender device 320, and devices whose language information was previously received from a server, such as server 310.

At Step 515, software or firmware executing on processor 102 of sender device 320 determines whether the message for recipient device 305 is displayable on recipient device 305. In some embodiments, software or firmware executing on a processor not physically located within sender device 320, such as processor 425, determines whether the message is displayable on recipient device 305. This determination includes, without limitation, determining whether one or more languages of composition associated with the message for recipient device 305 is not supported by recipient device 305. If, for example, a language of composition is not one of the one or more languages supported by recipient device 305, the message for recipient device 305 is determined to be not displayable on recipient device 305.

In some example embodiments, a language of composition associated with the message is a default language associated with an application, such as an electronic mail or text messaging application, used for composing the message. In other embodiments, a language of composition is a language a user associates with the message, by, for example, selecting a language different from the default language prior to or during message composition. In yet other embodiments, the message comprises character sets from two or more languages.

Determining whether the message for recipient device 305 is displayable on recipient device 305 involves determining whether one or more parts of the message is in a language not supported by recipient device 305. If, for example, the message body, the subject, or an attachment to the message for recipient device 305 is determined to be in a language not supported by recipient device 305, then the message itself is determined to be not displayable on recipient device 305.

If it is determined at Step 515, that the message for recipient device 305 is not displayable on recipient device 305, then at Step 520 the user of sender device 320 is notified that the message he/she intends to send to a user of recipient device 305, will not be displayable on recipient device 305.

According to various embodiments, Step 520 also involves providing the user of sender device 320 information on the one or more languages supported by the recipient device 305. For example, display 112 of sender device 320 may provide the user a list of languages that are supported by recipient device 305, and user interface elements displayed on display 112 may provide the user with the option of selecting a language from the list of languages supported by recipient device 305, as the language of composition to be associated with the message for recipient device 305.

In certain embodiments, software executing on processor 102 of sender device 320 downloads and installs one or more character sets associated with the one or more languages supported by recipient device 305. In certain other embodiments, server 310 notifies recipient device 305 that a sender device has attempted to send recipient device 305 a message in one or more languages not supported by recipient device 305. In response, software executing on processor 102 of recipient device 305 downloads and installs one or more character sets not previously installed on recipient device 305.

In some other embodiments, a message to recipient device 305 is routed through a remote server that translates one or more portions of the message into a language supported by recipient device 305, before the message is delivered to recipient device 305. In various embodiments, sender device 320, server 310, or an intermediate server routes the message for recipient device 305 through a remote server for translation purposes. According to certain other embodiments, the recipient device 305 may itself send a received message to a remote server for translation. Further, a message may be translated, in whole or in part, at the sender device 320, the recipient device 305, or the server 310.

Figure 6:
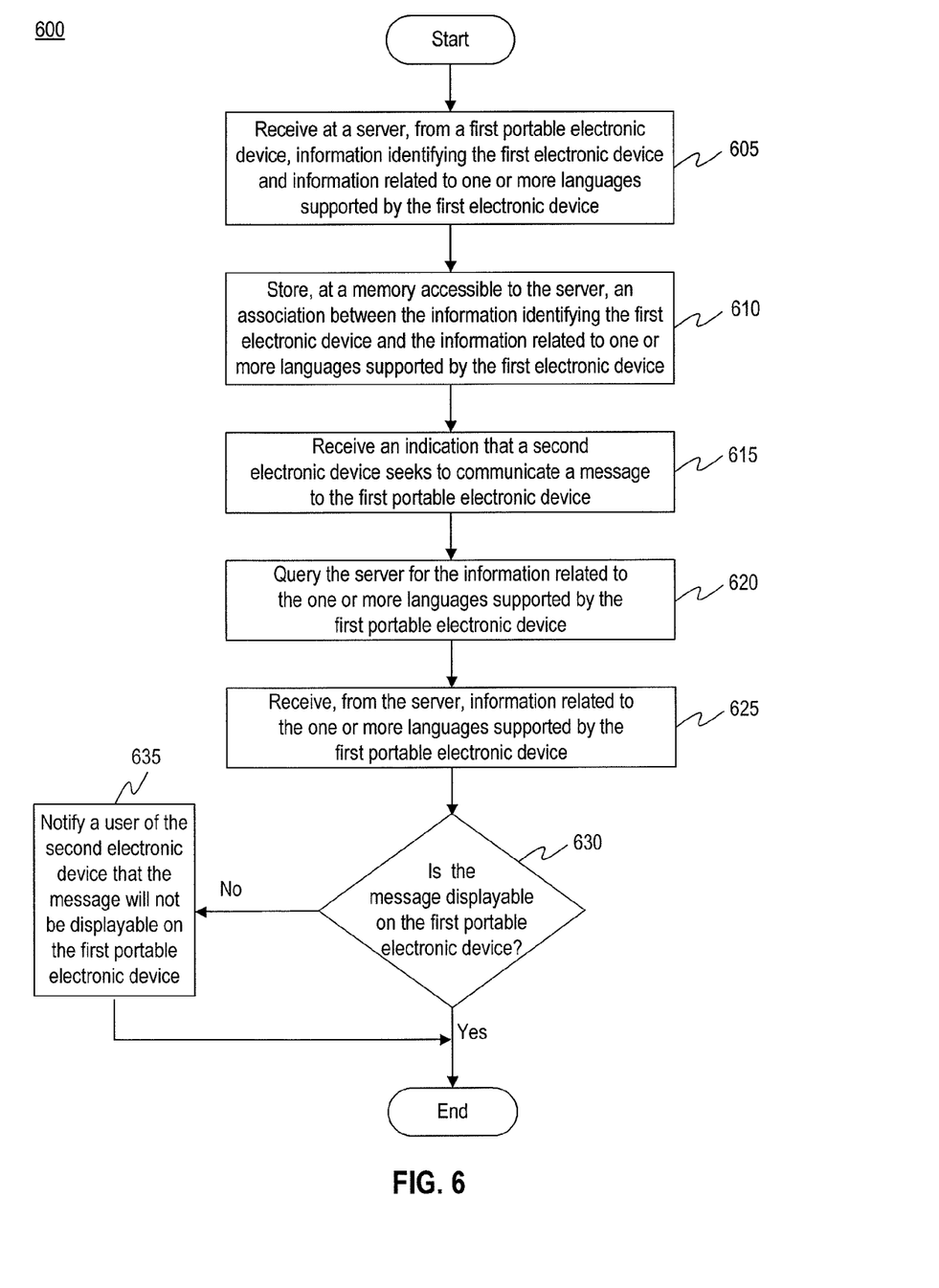

FIG. 6 is a flow diagram of an example process 600 for sharing information related to languages supported by portable electronic devices, consistent with disclosed example embodiments. At Step 605, a server receives from a first portable electronic device, information identifying the first portable electronic device, and information related to one or more languages supported by the first portable electronic device. In the present discussion of FIG. 6, for the sake of convenience and clarity alone, recipient device 305 is used as an example of the first portable electronic device, and server 310 is used as an example of the above-identified server.

At Step 610, server 310 stores, at a memory accessible to server 310, such as memory 315, an association between the information identifying the first portable electronic device (e.g. recipient device 305) and the information related to the one or more languages supported by recipient device 305. At Step 615, software or firmware executing on a processor 102 associated with a second electronic device receives an indication that a user of the second device wishes to communicate a message to a user of recipient device 305. In the present discussion of FIG. 6, for the sake of convenience and clarity alone, sender device 320 is used as an example of the second electronic device.

In response to the indication, at Step 620, server 310 is queried for information related to the one or more languages supported by recipient device 305. In some embodiments, software or firmware executing on a processor, such as processor 102 of sender device 320 or processor 425, queries server 310. In response to the query or queries, information related to the one or more languages supported by recipient device 305 is received in Step 625 from server 310. In various embodiments, processor 102 of sender device 320 or processor 425 receives the information related to the one or more languages supported by recipient device 305.

At Step 630, software or firmware executing, for example, on processor 102 of sender device 320 or processor 425, determines whether the message for recipient device 305 is displayable on recipient device 305. If it is determined at Step 630, that the message is not displayable on recipient device 305, then at Step 635, the user of sender device 320 is notified that the message he/she intends to send will not be displayable on recipient device 305.

Figure 7:
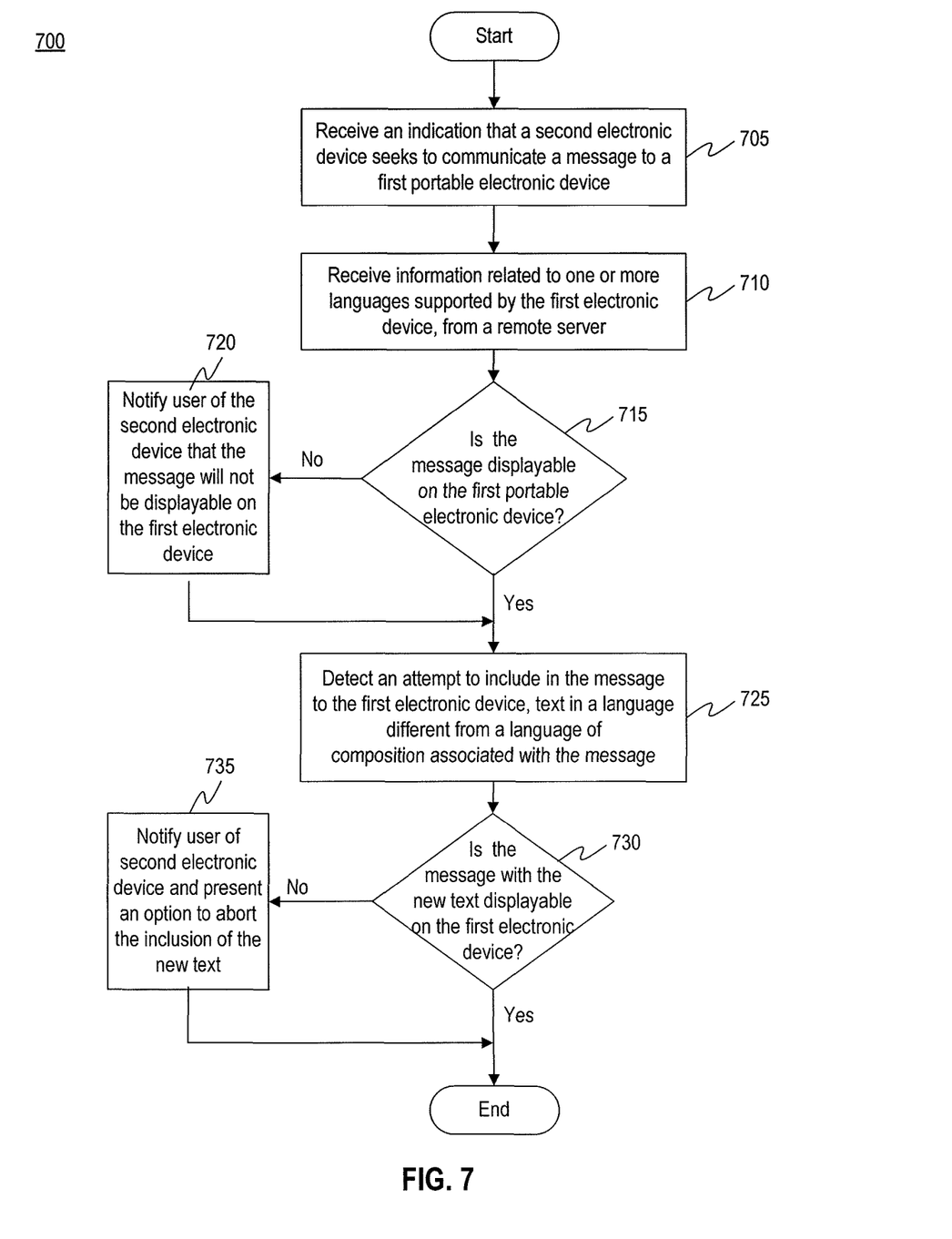

FIG. 7 is a flow diagram of an example process 700 for sharing information related to languages supported by portable electronic devices, consistent with disclosed example embodiments. At Step 705, software or firmware executing on a processor such as processor 102, receives an indication that a user of a second electronic device seeks to communicate a message to a user of a first portable electronic device. In the present discussion of FIG. 7, for the sake of convenience and clarity alone, sender device 320 will be used as an example second electronic device, and recipient device 305 will be used as an example first portable electronic device.

At Step 710, software or firmware executing, for example, on processor 102 of sender device 320 or on processor 425, receives from a server, such as server 310, information related to one or more languages supported by the recipient device 305. At Step 715, the software or firmware determines whether the message for a user of recipient device 305 is displayable on recipient device 305. If it is determined at Step 715, that the message is not displayable on recipient device 305, then, at Step 720, the user of sender device 320 is notified that the message he/she intends to send will not be displayable on recipient device 305.

If it is determined at Step 715 that the message is displayable on recipient device 305, then control proceeds to Step 725. In some embodiments, software or firmware executing, for example, on processor 102 of sender device 320, detects, in Step 725, an attempt by the user of sender device 320 to include in the message to the user of recipient device 305, text in a language that is different from a language of composition associated with the message to the user of recipient device 305. For example, if a language of composition associated with the message to the user of recipient device 305 is English, then an attempt to paste Chinese characters into the message body, will result in the detection of the aforementioned attempt to include text in a language that is different from a language of composition associated with the message.

At Step 730, software or firmware executing, for example, on processor 102 of sender device 320 or on processor 425, determines whether the message for the user of recipient device 305, including the text that the user of sender device 320 has attempted to include, is displayable on recipient device 305. In some example embodiments, the above determination involves determining whether the text that the user has attempted to include is in a language supported by recipient device 305.

If it is determined at Step 730, that the message for recipient device 305 is not displayable on recipient device 305, then at Step 735, the user of sender device 320 is notified that the message to recipient device 305, including the additional text that the user has attempted to include, is not displayable on recipient device 305. In certain embodiments, the user of sender device 320 is additionally presented with an option to abort the inclusion of the additional text into the message for the user of recipient device 305.

According to various embodiments, a determination of whether a message for a user of recipient device 305 is displayable on recipient device 305 is undertaken by processor 102 of sender device 320 after software or firmware executing on processor 102 detects a change in a language of composition associated with the message for the user of recipient device 305. For example, if while composing a message to recipient device 305 in the English language, the user of sender device 320 switches the language used for composing the message to Chinese, sender device 320 detects the change in language. Following the detection of this change, sender device 320 performs a determination of whether the message for the user of recipient device 305 is displayable on recipient device 305 given that the message will additionally be composed in Chinese.

Figure 8A:
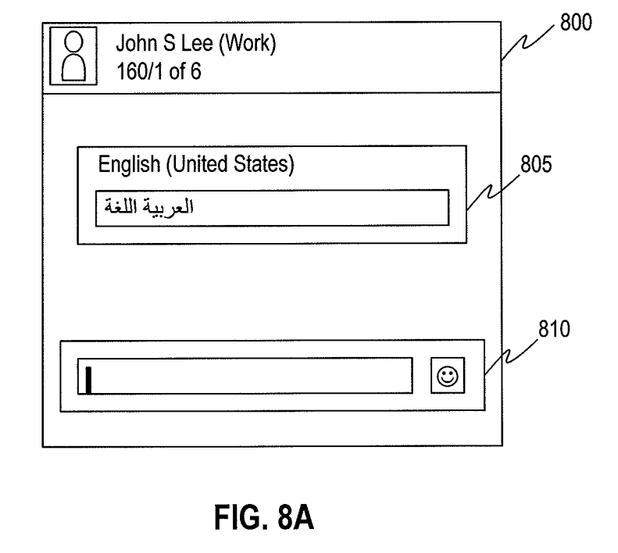
FIG. 8A depicts an example user interface used to specify a language of composition associated with a message, consistent with disclosed example embodiments.

FIG. 8A depicts an example user interface used to specify a language of composition associated with a message, consistent with disclosed example embodiments. The example user interface depicted in FIG. 8A is displayed on display 112 of sender device 320. User Interface component 800 is a window that, in certain embodiments, is used for composing a message, such as a text message. In the presently disclosed embodiment User Interface component 800 identifies John S. Lee as the recipient of the message. User Interface component 805 displays a default language associated with the message being composed and Drop-down Selection box that allows a new language of composition to be associated with the message being composed. User Interface component 810 is a Text-box that allows a user to enter text for the message being composed.

Figure 8B:
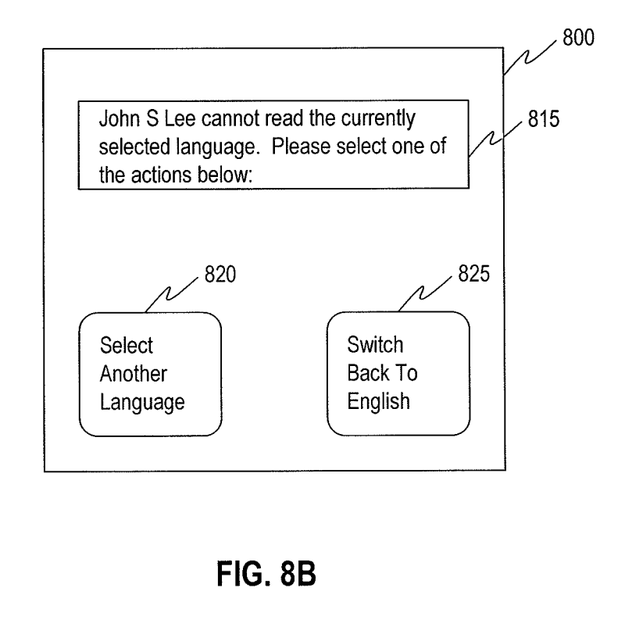
FIGS. 8B, 8C, and 8D each depict an example user interface providing information on the language capabilities of a portable electronic device, consistent with disclosed example embodiments.

FIG. 8B depicts an example user interface providing information on the language capabilities of a portable electronic device, consistent with disclosed example embodiments. The example user interface depicted in FIG. 8B is displayed on display 112 of sender device 320. User Interface component 800, according to certain embodiments, is used to provide information to a user of an electronic device such as sender device 320. For example, User Interface component 800 displays User Interface component 815 that notifies the user of sender device 320 that the currently selected language for composing a message bound for recipient device 305 cannot be read by the user of recipient device 305. In one configuration, User Interface component 820 is a button that, when activated, allows a user of a portable electronic device, such as sender device 320, to select another language for message composition. User Interface component 825 is another button that, when activated, allows the user to switch back to a default language, such as English, for message composition.

Figure 8C:
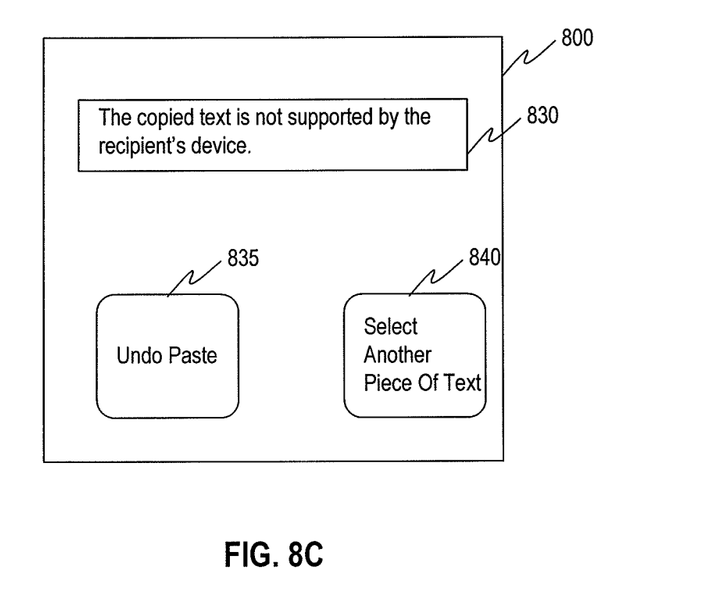

FIG. 8C depicts an example user interface providing information on the language capabilities of a portable electronic device, consistent with disclosed example embodiments. A user of an electronic device, such as sender device 320, copies text and attempts to paste the text into a message bound for a portable electronic device, such as recipient device 305. If the copied text is in a language not supported by recipient device 305, User Interface component 800 displays User Interface component 830 that notifies the user of sender device 320 that the currently copied text is not supported by recipient device 305. In one configuration, User Interface component 835 is a button that, when activated, allows the user of an electronic device, such as sender device 320, to undo a previously attempted 'Paste' operation. User Interface component 840 is another button that, when activated, allows the user to select another piece of text for inclusion in, for example, the message for recipient device 305.

Figure 8D:
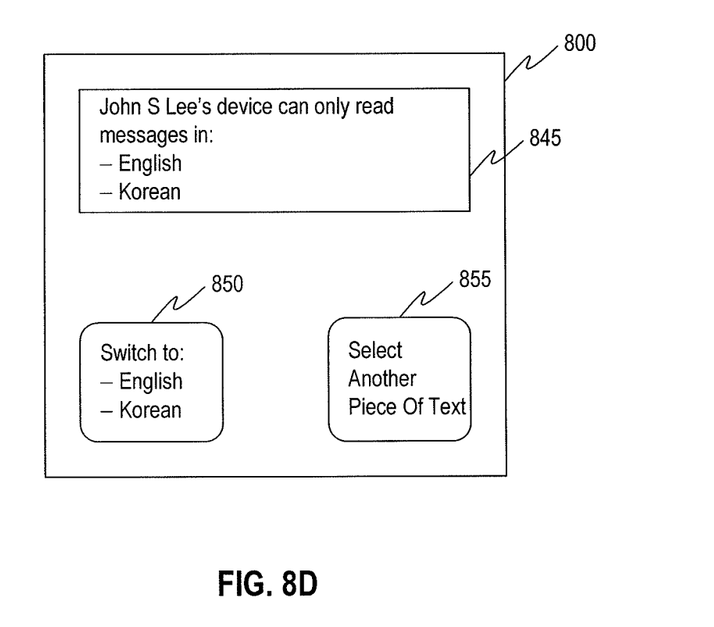

FIG. 8D depicts an example user interface providing information on the language capabilities of a portable electronic device, consistent with disclosed example embodiments. A user of an electronic device, such as sender device 320, copies text and attempts to paste the text into a message bound for a portable electronic device, such as recipient device 305. The user of sender device 320 enters text for inclusion in the message for recipient device 305. If the copied or typed text is in a language not supported by recipient device 305, User Interface component 800 displays User Interface component 845 that notifies the user of sender device 320 that recipient device 305 can only read messages in one or more languages, such as English and Korean.

In one configuration, User Interface component 850 is a button that, when activated, allows the user of an electronic device, such as sender device 320, to switch to a different language of composition. For example, User Interface component 850, in various embodiments, allows the user of sender device 320 to switch to one of the languages known to be supported by recipient device 305. User Interface component 855 is another button that, when activated, allows the user of sender device 320 to select another piece of text for inclusion in, for example, the message bound for recipient device 305.

Embodiments of processes disclosed herein may be implemented by one or more processors executing program instructions stored on computer-readable storage media, including, for example, volatile and non-volatile computer memory such as RAM, PROM, EPROM and EEPROM, floppy disks, compact disks, optical disks, and magnetic tape. Other means for implementing the processes disclosed herein include various combinations of hardware, firmware and software.

The present disclosure may be embodied in other specific forms without departing from its spirit or essential characteristics. Other embodiments will be apparent to those skilled in the art from consideration of the specification and practice of the various embodiments disclosed herein. The described embodiments are to be considered in all respects only as illustrative and not restrictive. All changes that come within the meaning and range of equivalency of the following claims are to be embraced within the scope of the claims.

What is claimed is:

1. A method for sharing information among electronic devices communicably connected in a network, wherein a server remote from the electronic devices stores information reflecting a set of languages supported by at least some of the electronic devices, the method comprising:

monitoring a second electronic device for an indication of a first message for communication to a first electronic device;

determining, based on the stored information reflecting a set of languages supported by the first electronic device, whether the first message is displayable on the first electronic device; and providing a notification that presents a user of the second electronic device with an option to compose a new message in one or more languages supported by the first electronic device, if the first message was determined to be not displayable on the first electronic device, wherein the determination of whether the first message is displayable on the first electronic device is made following one or more events comprising:

detecting a change in a language of composition associated with the first message to the first electronic device, and detecting an attempt to include in the first message to the first electronic device, text in a language different from the language of composition.

2. The method of claim 1, wherein the determination of whether the first message is displayable on the first electronic device comprises one or both of:

determining whether a language of composition associated with the first message is a language not supported by the first electronic device, and determining whether one or more parts of the first message is in a language not supported by the first electronic device.

3. The method of claim 1, wherein the indication of a first message for communication to the first electronic device comprises:

a specification of an identifier associated with the first electronic device, and an issuance of a command to transmit a message to the first electronic device.

4. The method of claim 1, further comprising:

querying the remote server for the information reflecting the set of languages supported by the first electronic device, using information identifying the first electronic device.

5. The method of claim 1, wherein the notification comprises:

a visual stimulus comprising a pop-up message, an auditory stimulus, and a tactile stimulus.

6. The method of claim 1, further comprising:

presenting an option to abort the inclusion of text in the first message to the first electronic device, where the text is of a language not supported by the first electronic device.

7. The method of claim 1, further comprising one or more of:

providing information on the set of languages supported by one or both of the first electronic device and the second electronic device;

downloading and installing on one or both of the first electronic device and the second electronic device, one or more character sets associated with the set of languages supported by one or both of the first electronic device and the second electronic device; and translating, at one or more of a remote server, the first electronic device, and the second electronic device, one or more portions of the first message to the first portable electronic device, into a language supported by the first electronic device.

8. A system for sharing language information among electronic devices communicably connected in a network, the system comprising:
- a first portable electronic device transmitting at least information identifying the first electronic device, and information reflecting a set of languages supported by the first electronic device;
- a server, remote from the first electronic device and a second electronic device, accessing one or more associations between information identifying electronic devices and information reflecting sets of languages supported by electronic devices;
- the second electronic device receiving from the server, the information reflecting the set of languages supported by the first electronic device; and
- a processor:
- determining, based on the information reflecting the set of languages supported by the first electronic device, whether a first message to the first electronic device is displayable on the first electronic device; and
- providing a notification that presents a user of the second electronic device with an option to compose a new message to the first electronic device in one or more languages supported by the first electronic device, if the first message was determined to be not displayable on the first electronic device,
- wherein the determination of whether the first message is displayable on the first electronic device is made following one or more events comprising:
- detecting a change in a language of composition associated with the first message to the first electronic device, and
- detecting an attempt to include in the first message to the first electronic device, text in a language different from the language of composition.

9. The system of claim 8 wherein the determination of whether the first message is displayable on the first electronic device comprises one or both of:
- determining whether a language of composition associated with the first message is a language not supported by the first electronic device, and
- determining whether one or more parts of the first message is in a language not supported by the first electronic device.

10. The system of claim 8 wherein the server:
- receives from the first electronic device, the information identifying the first electronic device, and the information reflecting the set of languages supported by the first electronic device; and
- stores, using a memory, one or more associations between the information identifying the first electronic device, and the information reflecting the set of languages supported by the first electronic device.

11. The system of claim 8, wherein the second electronic device receives the information reflecting the set of languages supported by the first electronic device subsequent to an indication of a message for communication to the first electronic device, the indication comprising:
- a specification of an identifier associated with the first electronic device, and
- an issuance of a command to transmit a message to the first electronic device.

12. The system of claim 8, wherein the server accesses the one or more associations in response to a query for the information reflecting the set of languages supported by the first electronic device, the query comprising information associated with identifying the first electronic device.

13. The system of claim 8, further comprising:
- a user interface for presenting an option to abort the inclusion of text in the first message to the first electronic device, where the text is of a language not supported by the first electronic device.

14. The system of claim 8, further comprising one or more of:
- a user interface providing information on the set of languages supported by one or both of the first electronic device and the second electronic device;
- one or both of: the first electronic device and the second electronic device, downloading and installing one or more character sets associated with the set of languages supported by one or both of the first electronic device and the second electronic device; and
- one or more of: a server remote from the first electronic device and the second electronic device, the first electronic device, and the second electronic device, translating one or more portions of the first message to the first portable electronic device, into a language supported by the first electronic device.

15. The system of claim 8, wherein the information reflecting the set of languages supported by the first electronic device comprises one or more character sets recognized by the first electronic device.

16. A system for sharing information reflecting a set of languages supported by portable electronic devices communicably connected in a network, the system comprising:
- a storage device for storing instructions; and
- a processor for executing the instructions to:
- receive from a first portable electronic device, information identifying the first electronic device, and information reflecting a set of languages supported by the first electronic device;
- store, on the storage device, one or more associations between the information identifying the first electronic device, and the information reflecting the set of languages supported by the first electronic device;
- receive from a second electronic device, a query for information reflecting the set of languages supported by the first electronic device;
- determine, based on the stored information reflecting the set of languages supported by the first electronic device, whether a first message for communication to the first electronic device is displayable on the first electronic device; and
- present a user of the second electronic device with an option to compose a new message in one or more languages supported by the first electronic device, if the first message was determined to be not displayable on the first electronic device,
- wherein the determination of whether the first message is displayable on the first electronic device is made following one or more events comprising:
- detecting a change in a language of composition associated with the first message for communication to the first electronic device, and
- detecting an attempt to include in the first message for communication to the first electronic device, text in a language different from the language of composition.

17. A computer-readable non-transitory storage medium comprising programmable instructions adapted to perform a method for sharing information among electronic devices communicably connected in a network, wherein a server remote from the electronic devices stores information reflecting a set of languages supported by at least some of the electronic devices, the method comprising:

monitoring a second electronic device for an indication of a first message for communication to a first electronic device;

determining, based on the stored information reflecting a set of languages supported by the first electronic device, whether the first message is displayable on the first electronic device; and providing a notification that presents a user of the second electronic device with an option to compose a new message in one or more languages supported by the first electronic device, if the first message was determined to be not displayable on the first electronic device, wherein the determination of whether the first message is displayable on the first electronic device is made following one or more events comprising:

detecting a change in a language of composition associated with the first message to the first electronic device, and detecting an attempt to include in the first message to the first electronic device, text in a language different from the language of composition.

18. A portable electronic device for sharing information reflecting a set of supported languages, the device comprising:

a storage device for storing instructions; and a processor for executing the instructions to:

detect an event requiring a communication of information reflecting a set of languages supported by the electronic device; and communicate to a remote server, at least information identifying the electronic device, and the information reflecting the set of supported languages determine, based on information accessible to the remote server and reflecting a set of languages supported by a second electronic device, whether a first message for communication to the second electronic device is displayable on the second electronic device; and present a user of the portable electronic device with an option to compose a new message for communication to the second electronic device in one or more languages supported by the second electronic device, if the first message was determined to be not displayable on the second electronic device, wherein the determination of whether the first message is displayable on the second electronic device is made following one or more events comprising:

detecting a change in a language of composition associated with the first message for communication to the second electronic device, and detecting an attempt to include in the first message for communication to the second electronic device, text in a language different from the language of composition.

* * * * *